UNITED STATES PATENT OFFICE.

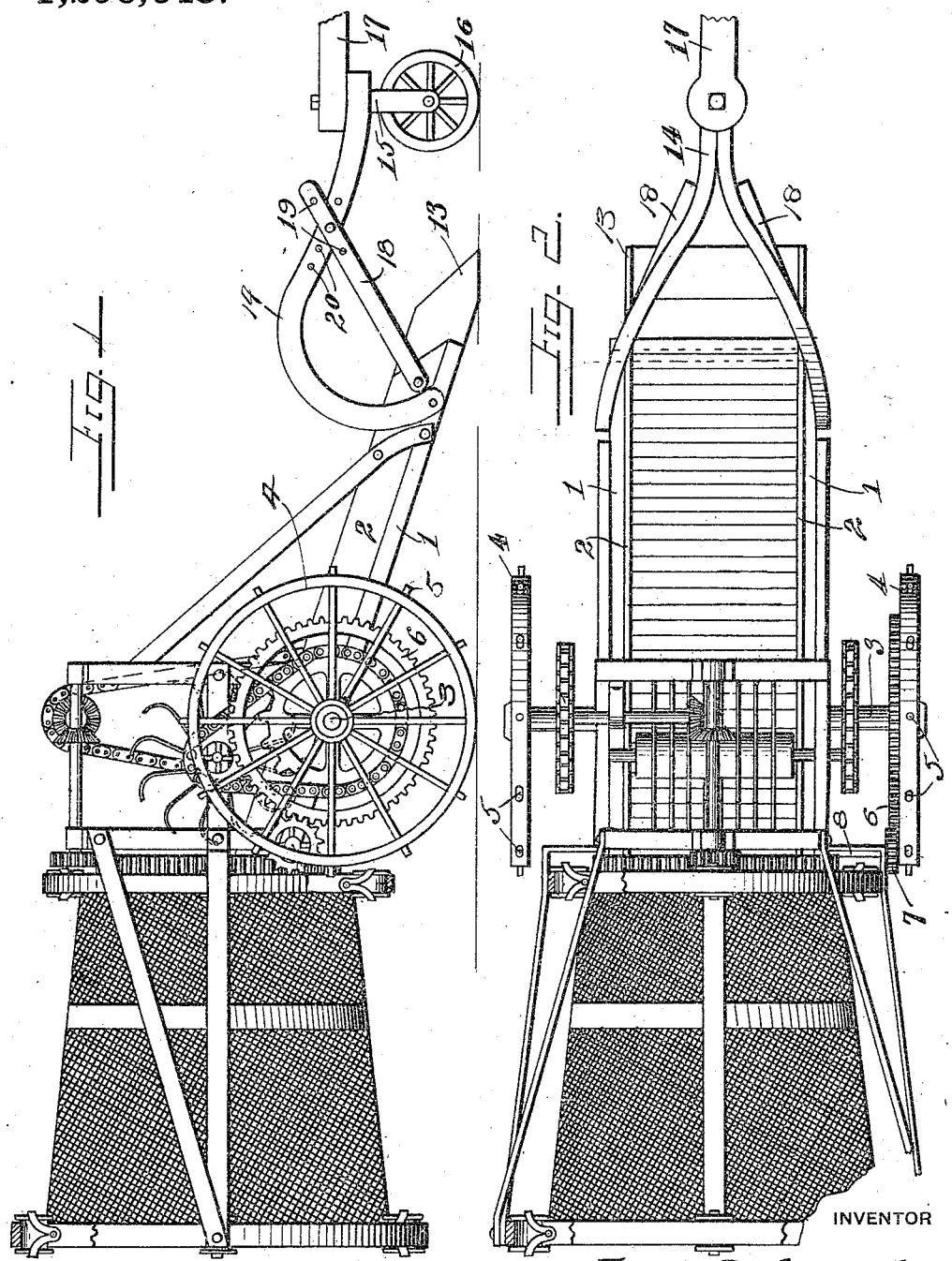

FRANK P. GINSBACH, OF WATERTOWN, SOUTH DAKOTA.

AGRICULTURAL MACHINE.

1,296,648.  Specification of Letters Patent.  Patented Mar. 11, 1919.

Application filed October 2, 1916. Serial No. 123,354.

*To all whom it may concern:*

Be it known that I, FRANK P. GINSBACH, a citizen of the United States, residing at Watertown, in the county of Codington and State of South Dakota, have invented certain new and useful Improvements in Agricultural Machines, of which the following is a specification.

This invention relates to agricultural machines, and more particularly to a machine specially adapted for the eradication of grass and similar weeds.

The main object is to provide a machine of the character stated of simple construction and operation, the frame of which is so braced as to be well able to withstand the strains to which it is subjected.

Further objects will appear from the detailed description.

In the drawings:

Figure 1, is a side view of the machine.

Fig. 2, is a top plan view.

A forwardly and downwardly inclined conveyer frame having the side bars 1 and side pieces 2 is rockably supported on a tranverse axle 3. This axle is rotatably mounted in bearing blocks formed on the side bars of the conveyer frame and is provided at each end with a ground wheel 4 keyed thereon. The periphery of each wheel is provided with a plurality of radially projecting gripping pins 5 formed from extensions of the wheel spokes.

A downwardly and forwardly tapering cutting shoe 13 is secured on the lower end of the conveyer frame. A bifurcated beam 14 is pivotally secured to each side piece 2 of the conveyer frame near the lower end thereof. The outer end of this beam is pivoted on a wheel frame 15 which carries a caster wheel 16. A tongue 17 is secured on the spindle of the wheel frame 15 above the beam 14, and is adapted to be attached to any suitable traction means. A brace bar 18 is pivotally secured at its lower end to the side piece 2 of the conveyer frame and is provided in its upper portion with a plurality of apertures 19 adapted to be brought into register with apertures 20 through the beam 14. By bringing any two of these apertures into register and inserting a bolt through the same, the distance between the beam 14 and the shoe 13 may be adjusted so as to vary the inclination of the conveyer frame. By this means the cutting shoe may be secured in adjustment to cut at any desired depth. As will be noted more clearly from Fig. 1 of the drawings, the bar 18 extends across the arched portion of beam 14 and is so related thereto that all strains tending to distort the beam will be transmitted longitudinally of the brace bar, this bar being, therefore, capable of sustaining relatively great strains and serving to effectually prevent breaking or distortion of the beam.

What I claim is:

In a machine of the character described, a wheel mounted axle, a downwardly and forwardly inclined conveyer frame rockably mounted thereon adjacent its upper end, a beam having its rearward portion bifurcated to form two rearwardly diverging arms bent into arcuate shape and having their rearward ends pivotally secured to the sides of the conveyer frame, a ground wheel carried at the forward end of said beam and serving to maintain the same in fixed relation to the ground surface, and a brace bar pivotally secured at its rearward end to the conveyer frame in advance of the lower ends of said arms and adjustably secured adjacent its forward end to the forward portion of said beam so as to normally prevent relative movement between the beam and the conveyer frame, and to permit the inclination of the conveyer frame to be varied, said bar extending across the arc formed by one of the arms so as to provide a bracing member for preventing distortion of said arms, the bar being so disposed as to have all strains transmitted longitudinally thereof.

In testimony whereof I affix my signature in presence of two witnesses.

FRANK P. GINSBACH.

Witnesses:
M. BIERSCHEID,
Jos. P. TURNER.

Copies of this patent may be obtained for five cents each, by addressing the "Commissioner of Patents, Washington, D. C."